United States Patent
Rush, Jr.

(10) Patent No.: US 6,670,062 B2
(45) Date of Patent: Dec. 30, 2003

(54) METHODS AND SYSTEMS FOR HUMIDIFYING FUEL FOR USE IN FUEL PROCESSORS AND FUEL CELL SYSTEMS

(75) Inventor: Kenneth M. Rush, Jr., Clifton Park, NY (US)

(73) Assignee: Plug Power Inc., Latham, NY (US)

( * ) Notice: Subject to any disclaimer, the term of this patent is extended or adjusted under 35 U.S.C. 154(b) by 308 days.

(21) Appl. No.: 09/871,055

(22) Filed: May 31, 2001

(65) Prior Publication Data

US 2002/0182455 A1 Dec. 5, 2002

(51) Int. Cl.[7] .......................... H01M 8/18; H01M 8/04; H01M 8/12
(52) U.S. Cl. ............................ 429/20; 429/17; 429/26
(58) Field of Search ............................. 429/13, 26, 17, 429/19, 20

(56) References Cited

U.S. PATENT DOCUMENTS

| | | | |
|---|---|---|---|
| 3,615,850 A | 10/1971 | Chludzinski et al. | 136/86 |
| 4,362,788 A | 12/1982 | Maru et al. | 429/13 |
| 4,365,006 A | 12/1982 | Baker | 429/17 |
| 4,530,886 A | 7/1985 | Sederquist | 429/13 |
| 4,670,359 A | 6/1987 | Beshty et al. | 429/17 |
| 4,743,517 A | 5/1988 | Cohen et al. | 429/17 |
| 5,605,770 A | 2/1997 | Andreoli et al. | 429/20 |
| 6,045,933 A | 4/2000 | Okamoto | 429/17 |
| 6,045,934 A | 4/2000 | Enami | 429/30 |
| 6,103,411 A * | 8/2000 | Matsubayashi et al. | 429/17 |
| 6,551,732 B1 * | 4/2003 | Xu | 429/17 |
| 6,551,733 B2 * | 4/2003 | Peschke et al. | 429/24 |

FOREIGN PATENT DOCUMENTS

| | | |
|---|---|---|
| JP | 57-36784 | 2/1982 |
| JP | 58-166673 | * 10/1983 |
| JP | 60-198065 | 10/1985 |

OTHER PUBLICATIONS

Rush, Jr., pending U.S. patent application Ser. No. 09/676,153, filed Sep. 29, 2000, entitled Method and System For Humidification Of A Fuel (Attorney Docket No. 1404.059).

* cited by examiner

*Primary Examiner*—Patrick Ryan
*Assistant Examiner*—Thomas H. Parsons
(74) *Attorney, Agent, or Firm*—Heslin Rothenberg Farley & Mesiti P.C.

(57) ABSTRACT

A method for humidifying a mixture of dry fuel and air for use in a fuel processor may include receiving a mixture of dry fuel and air at a first temperature such as ambient temperature, heating the mixture of dry fuel and air to a second temperature greater than the first temperature, and combining the mixture of dry fuel and air at the second temperature with water. A fuel cell system incorporating such method may include a humidifier for humidifying a mixture of dry dry fuel and air which is processed in a fuel processor to produce reformate, and a fuel cell for receiving the reformate and generating electricity. A heat exchanger is provided for heating the mixture of dry fuel and air prior to humidification in the humidifier. The heat exchanger may be provided in the fuel processor or operably connected to an anode tail-gas oxidizer.

57 Claims, 3 Drawing Sheets

METHODS AND SYSTEMS FOR HUMIDIFYING FUEL FOR USE IN FUEL PROCESSORS AND FUEL CELL SYSTEMS

CROSS-REFERENCE TO RELATED APPLICATION

This application is related to commonly assigned, co-pending patent application Ser. No. 09/676,153, filed Sep. 29, 2000 by Rush and entitled "Method and System for Humidification of a Fuel", now U.S. Pat. No. 6,514,634. which is hereby incorporated herein by reference in its entirety.

FIELD OF THE INVENTION

This invention relates generally to fuel cell systems, and more particularly to methods and systems for humidifying a supply of gas, e.g., fuel and air, for use in fuel processors and fuel cell systems.

BACKGROUND OF THE INVENTION

Fuel cells electrochemically convert reactants, for example, a fuel and an oxidant, to electricity. Unlike batteries, which typically contain a set amount of chemicals for generating electricity and which stop delivering electricity once the chemicals are consumed, fuel cells can deliver electricity continuously as long as the fuel cells receive a fuel and an oxidant.

A Proton Exchange Membrane (hereinafter "PEM") fuel cell converts the chemical energy of reactants such as hydrogen and oxidants such as air/oxygen directly into electrical energy. The PEM is a solid polymer electrolyte that permits the passage of protons (i.e., H+ ions) from the "anode" side of a fuel cell to the "cathode" side of the fuel cell while preventing passage therethrough of the reactants (e.g., hydrogen and air/oxygen).

In PEM fuel cells, typically the membrane works more effectively if it is wet. Conversely, once any area of the membrane dries out, the electrochemical reaction in that area stops. Eventually, the dryness can progressively march across the membrane until the fuel cell fails completely. As a result, the fuel and oxidant fed to each fuel cell are usually humidified, e.g., with steam.

Where pure reactants are not readily available or economical to supply to a fuel cell, it may be desirable to use air as an oxygen source, and to use a fuel processor to convert a hydrocarbon such as methane or methanol into a hydrogen-rich stream. The two reactions which are generally used to achieve this conversion as shown in equations (1) and (2).

  (1)

  (2)

The reaction shown in equation (1) is sometimes referred to as catalytic partial oxidation (CPO). The reaction shown in equation (2) is generally referred to as steam reforming. A fuel processor may use either of these reactions separately, or both in combination. While the CPO reaction is exothermic, the steam reforming reaction is endothermic. A reactor utilizing both reactions to maintain a relative heat balance is sometimes referred to as an autothermal reactor (ATR). Also, it should be noted that fuel processors are sometimes generically referred to as reformers, and the fuel processor output gas is sometimes generically referred to as reformate, without respect to which reaction is employed.

As evident from equations (1) and (2), both reactions produce carbon monoxide (CO). Because of the high temperature at which the fuel processor is operated, this CO generally does not affect the catalysts in the fuel processor. However, if this reformate is passed to a fuel cell system operating at a lower temperature (for example, less than 100 degrees C.), the CO may poison the catalysts in the fuel cell by binding to catalyst sites, inhibiting the hydrogen in the cell from reacting. In such systems it is typically necessary to reduce CO levels to less than 100 parts per million (ppm). For this reason the fuel processor may employ additional reactions and processes to reduce the CO that is produced. For example, two additional reactions that may be used to accomplish this objective are shown in equations (3) and (4). The reaction shown in equation (3) is generally referred to as the shift reaction, and the reaction shown in equation (4) is generally referred to as preferential oxidation (PROX).

  (3)

  (4)

As evident from equations (2) and (3), water may be employed as a reactant in a fuel processing system. It thus may be desirable to control the amount of water added to the fuel processor, for example to control the temperature of an ATR or reforming reactor, or to drive the shift reaction to eliminate carbon monoxide. In the case of ATRs and reforming reactors, the amount of water in feed streams to such reactors is generally referred to as the steam-to-carbon ratio.

For example, a fuel may be humidified with steam prior to entering the fuel processor. Another approach provides a supply of fuel and air at ambient temperature which is humidified with heated water prior to entering the fuel processor.

There is a need for improvements in methods and systems for humidifying fuel for use in a fuel processor and improvements in fuel cell system efficiency.

SUMMARY OF THE INVENTION

The present invention provides, in a first aspect, a method for humidifying a supply of fuel and air for use in a fuel processor in which the method includes receiving the supply of fuel and air at a first temperature, heating the supply of fuel and air to a second temperature greater than the first temperature, and combining the supply of fuel and air at the second temperature with a supply of water.

The present invention provides, in a second aspect, a method for generating electricity in which the method includes receiving a supply of fuel and air at a first temperature, heating the supply of fuel and air to a second temperature greater than the first temperature, combining the supply of fuel and air at the second temperature with a supply of water, reforming the combined supply of fuel, air, and water, and reacting the reformed supply of fuel, air, and water with an oxidant to generate electricity.

The present invention provides, in a third aspect, fuel processor for reforming a supply of fuel and air for a fuel cell in which the fuel processor includes a first heat exchanger for heating a supply of fuel and air at a first temperature to a second temperature greater than the first temperature prior to humidification of the supply of fuel and air, an autothermal reactor for receiving the supply of fuel and air after humidification, at least one of a high temperature shift device and a low temperature shift device operably connected to the autothermal reactor, and a preferential oxidation device, operably connected to the at least one of the high temperature shift device and the low temperature shift device, for discharging a supply of reformate.

The present invention provides, in a fourth aspect, a fuel cell system which includes means for heating a supply of fuel and air at a first temperature to a second temperature greater than the first temperature, means for humidifying the supply of fuel and air at the second temperature, means for reforming the supply of humidified fuel and air, and means for reacting the reformed supply of humidified fuel and air with an oxidant to generate electricity.

The present invention provides, in a fifth aspect, a fuel cell system which includes a first heat exchanger for heating a supply of fuel and air to a second temperature greater than the first temperature, a humidifier for humidifying the supply of fuel and air at the second temperature, a fuel processor for reforming the supply of humidified fuel and air, and a fuel cell for reacting the reformed supply of humidified fuel and air with an oxidant to generate electricity.

BRIEF DESCRIPTION OF THE DRAWINGS

The subject matter which is regarded as the invention is particularly pointed out and distinctly claimed in the concluding portion of the specification. The invention, however, may best be understood by reference to the following detailed description of the preferred embodiments and the accompanying drawing in which:

DETAILED DESCRIPTION OF THE INVENTION

Figure 1:
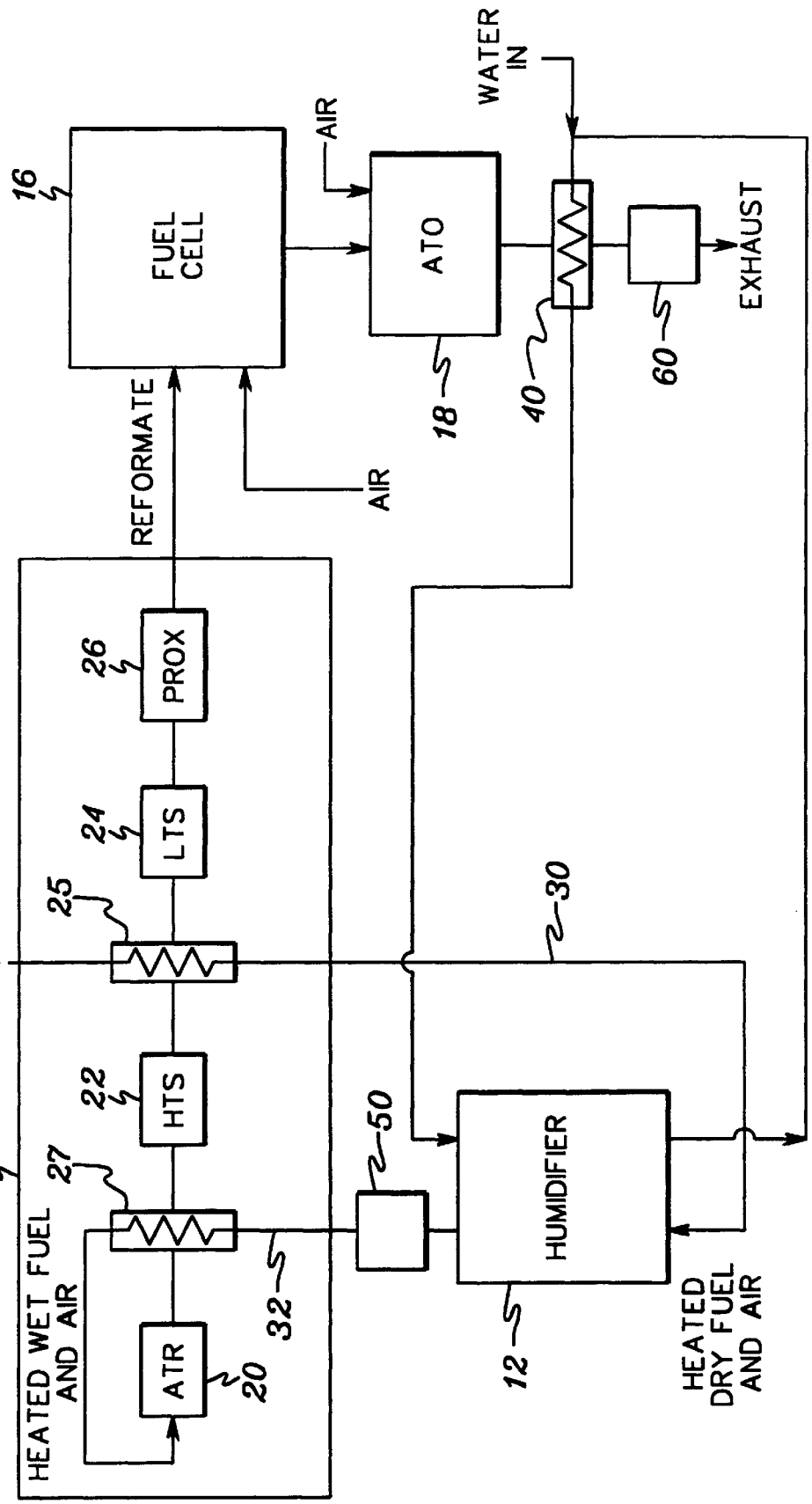
FIG. 1 is a schematic diagram of one embodiment of a fuel cell system according to the present invention.

FIG. 1 illustrates a schematic diagram of one embodiment of a fuel cell system 10 according to the present invention. In this illustrated embodiment, fuel cell system 10 generally includes a humidifier 12 for humidifying a supply of dry fuel (e.g., a hydrocarbon fuel such as methane, propane, or natural gas) and air, a fuel processor 14 for reforming the supply of the humidified fuel and air and producing a supply of reformate, a fuel cell 16 for receiving the reformate and an oxidant such as oxygen or air to generate electricity, and an anode tail-gas oxidizer (ATO) 18 for combusting exhaust reformate from the fuel cell for use in heating a supply of water supplied to humidifier 12.

As illustrated in FIG. 1, fuel processor 14 is also used to heat the supply of dry fuel and air prior to humidification. As described in greater detail below, heating the supply of dry fuel and air prior to humidification of the reactant allows a reduction in the heating of a supply of water which needs to be fed to the humidifier for humidifying the dry fuel and air.

For example, fuel processor 14 may include an autothermal reactor (ATR) 20 for converting a supply of humidified fuel and air to a hydrogen-rich stream. The hydrogen-rich stream may then be passed through a high temperature shift (HTS) 22 and a low temperature shift (LTS) 24 for water gas shifting of CO to CO2 and water to hydrogen. The hydrogen-rich stream may also be passed though a preferential oxidation device (PROX) 26 for oxidizing the CO in the hydrogen-rich stream to CO2.

In this illustrated embodiment, a heat exchanger 25 is disposed between HTS 22 and LTS 24 for heating the supply of dry fuel and air, and a heat exchanger 27 is disposed between ATR 20 and HTS 22 for heating the supply of humidified fuel and air which is then fed to ATR 20.

In operation of fuel cell system 10 for generating electricity, the supply of dry fuel and air at a temperature TI, e.g., generally ambient temperature, is passed through heat exchanger 25 and heated to a temperature T2 which is greater than temperature T1. The heated dry air and fuel are then transferred via a conduit 30 to humidifier 12 for humidification with a supply of water which may be heated as explained below. The humidified fuel and air discharged from humidifier 12 at a temperature T3 is transferred via a conduit 32 to heat exchanger 27 and heated to a temperature T4 which is greater than temperature T3. The heated supply of humidified fuel and air is then transferred to ATR 20 for reforming. The hydrogen-rich stream produced in ATR 20 then passes through heat exchanger 27, HTS 22, heat exchanger 25, LTS 24, and PROX 26.

The hydrogen-rich stream is then transferred to fuel cell 16 where it is reacted with a supply of an oxidant such as oxygen or air in fuel cell 16 to generate electricity as is known in the art. The exhaust hydrogen-rich stream may be combusted with air in ATO 18 to produce heat. The heat from ATO 18 may pass through a heat exchanger 40 for heating the supply of water which is feed to humidifier 12.

Figure 2:
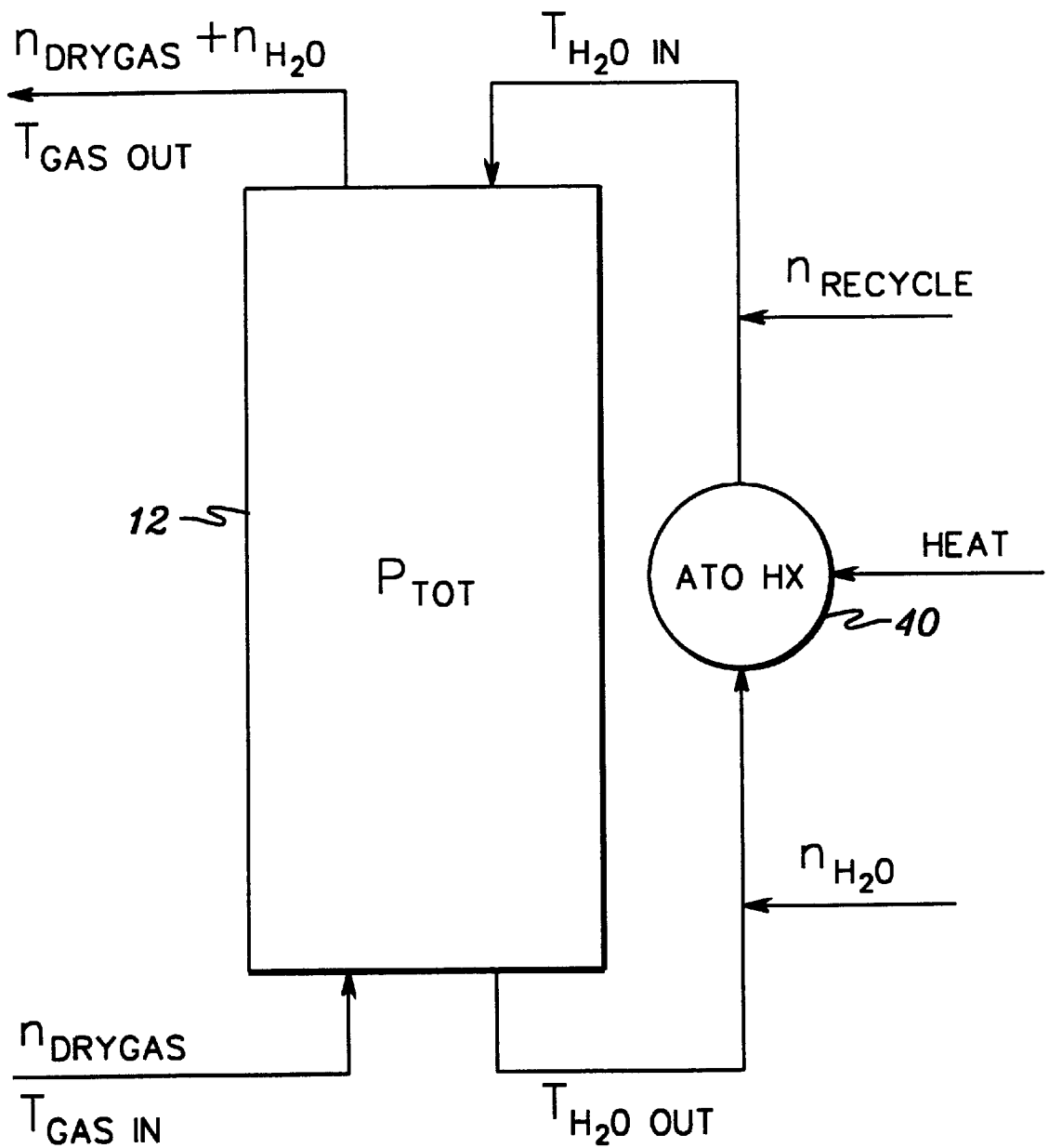
FIG. 2 is an enlarged schematic diagram of the humidifier and anode tail-gas oxidizer shown in FIG. 1.

With reference to FIG. 2, preheating the incoming supply of dry fuel and air reduces the energy required for heating the water supplied to the humidifier. For example, the energy balance of the humidifier and anode tail-gas oxidizer vent exchanger in connection with the supply of fuel and air (e.g., gas) and the supply of water may be represented as follows:

$$\{[(n_{DRYGAS}+n_{H2O})C_{Pmixture}T_{GASOUT}]-[n_{DRYGAS}C_{Pgas}T_{GASIN}]\}=[n_{RECYCLE}C_{Pwater}(T_{H2OIN}-T_{H2OOUT})]$$

where n is a mass flow rate, $C_P$ is a heat capacity, T is a temperature.

The energy balance may be also represented as HEAT/$\epsilon$ where $\epsilon$ is the efficiency of the ATO heat exchanger for heating the water. Thus, the HEAT required can be represented as follows:

$$HEAT=\epsilon\{[(n_{DRYGAS}+n_{H2O})C_{Pmixture}T_{GASOUT}]-[n_{DRYGAS}C_{Pgas}T_{GASIN}]\}$$

This shows that a larger $T_{GASIN}$ reduces the heat required from the ATO heat exchanger, and thus, reduces the temperature $T_{H2OIN}$ of the water needed to be supplied to the humidifier. Accordingly, the water does not have to be heated as hot, boiling of the supply of heated water is reduced, the flow rate of the water may be made faster, the operation of the ATO may be at a lower temperature, the size of the ATO may be reduced, and the size of the heat exchanger used for heating the water may be reduced, compared to the prior art where the supply of dry fuel and air are not heated.

With reference again to FIG. 1, a blower 50 may be provided in conduit 32 for receiving and pressuring the supply of humidified fuel and air which is fed to fuel processor 14. By placing the blower between the humidifier and the fuel processor, the pressure in the humidifier is reduced compared to providing a blower before the humidifier, e.g., pressurizing the supply of fuel and air in conduit 30. The reduced pressure in the humidifier also reduces the heat required for humidifying the supply of fuel and air. The technique of reducing the pressure in the humidifier is further described in commonly assigned, co-pending patent application Ser. No. 09/676,153, filed Sep. 29, 2000 by Rush, and is entitled "Method and System for Humidification of a Fuel," now U.S. Pat. No. 6,514,634, which is hereby incorporated herein by reference in its entirety.

Alternatively, as shown in FIG. 1, a vacuum 60 may be provided at the exhaust of the system for drawing in the exhaust from the system to reduce the pressure in the system including reducing the pressure in the humidifier, and thus, reducing the heat required for humidifying the supply of fuel and air. Other benefits of an exhaust vacuum include increased safety of the system by reducing the likelihood of a leak occurring in the system, as well as higher partial pressures of hydrogen for more efficient stack operation.

Figure 3:
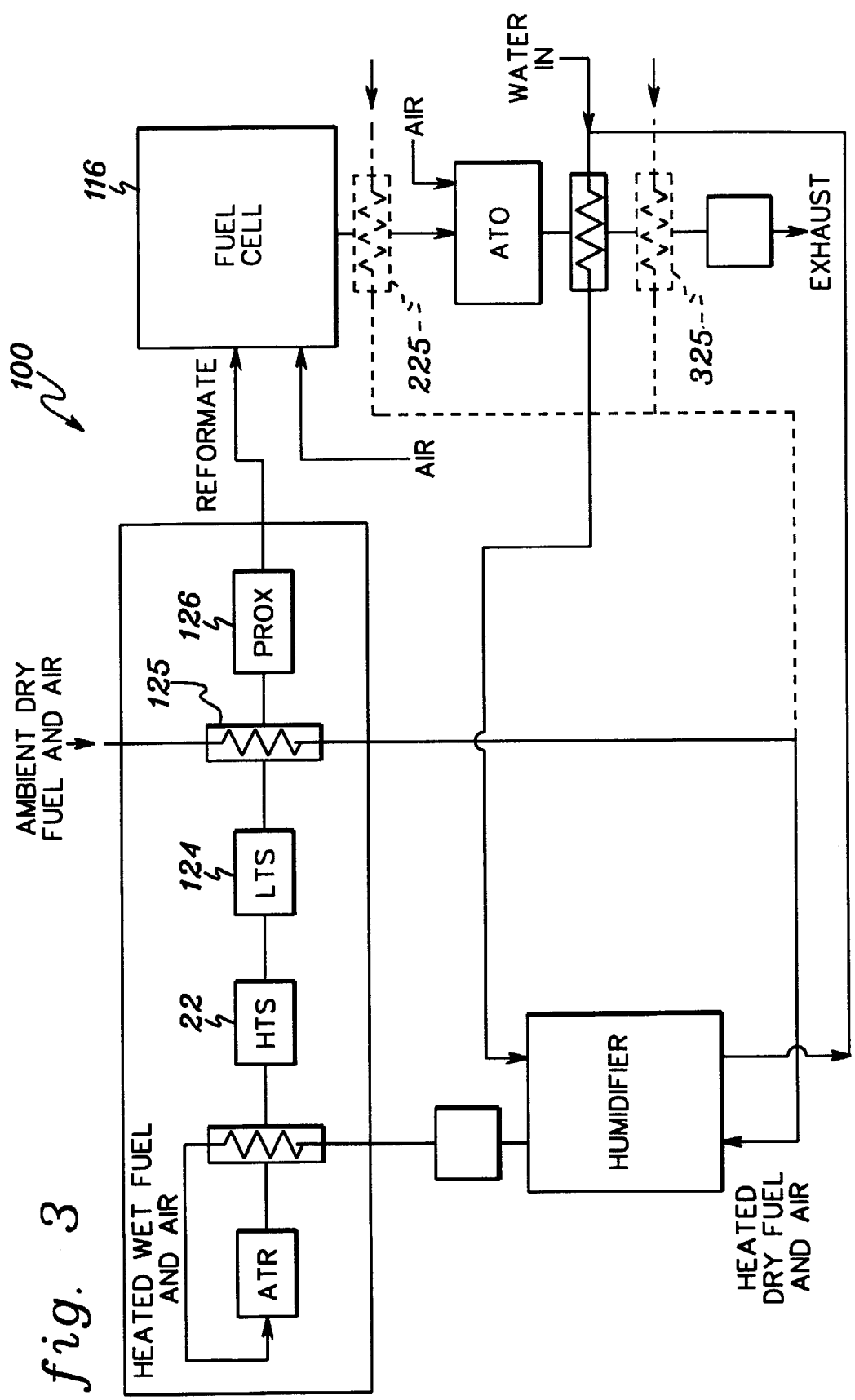
FIG. 3 is a schematic diagram of another embodiment of a fuel cell system according to the present invention.

FIG. 3 illustrates another embodiment of a fuel cell system 100 according to the present intention. In this illustrated embodiment, the supply of dry fuel and air may be heated by a heat exchanger 125 disposed between an LTS 124 and a PROX 126. Alternatively, a heat exchanger 225 (shown in dashed lines) operable to receive exhaust reformate from a fuel cell 116 or a heat exchanger 325 (shown in dashed lines) operably connected to an ATO may be used for heating the supply of dry fuel and air. In further embodiments, the dry fuel and air may be heated in a heat exchanger disposed between the fuel processor and the fuel cell.

In addition, the water may be heated using a heat exchanger disposed in the fuel processor, using a heat exchanger disposed between the fuel processor and the fuel cell, using a heat exchanger for receiving exhaust reformate from the fuel cell, or using an ATO heat exchanger. It will also be appreciated that other separate heating units may be used to heat the supply of water.

Using the waste heat in the fuel cell system, e.g., in the fuel processor, from the reformate prior to introduction into the fuel cell, the waste heat in the exhaust reformate from the fuel cell, or using an anode tail-gas oxidizer, to heat the supply of dry fuel and air, and the supply of water, allows increasing the overall efficiency of the fuel cell system compared to using external sources for heating the supply of dry fuel and air, and the supply of water.

With reference to FIGS. 1 and 3 again, the fuel cell may include a fuel cell stack having a plurality of individual fuel cells. The fuel cell may include a solid polymer membrane or PEM (proton exchange membrane) such as a NAFION material manufactured by E. I. Du Pont de Nemours Company. The membrane may be sandwiched between catalysts, gas diffusion layers and a pair of fluid flow plates as is known in the art. The fluid flow plates may be provided with fluid flow channels for servicing reactants such as hydrogen or reformate to one side of the PEM and air or oxygen to the other side of the PEM. Where the fuel cell includes a plurality of fuel cells forming a fuel cell stack, end plates may be provided for compressing the plurality of fuel cells. Manifolds may also be provided in the fuel cell plates for servicing the reactants to the fluid flow channels of the fluid flow plates. By connecting an external load (not shown) between electrical contacts (not shown) of current collector/conductor plates (not shown), one can complete a circuit for use of current generated by the one or more PEM-type fuel cells. A PEM-type fuel cell stack may be cooled to operate at a temperature between about 20 degrees Celsius (C.), i.e., ambient, and about 110 degrees C., and preferably around 65 degrees C+/−10 degrees C. It will be appreciated that other systems may operate at higher or lower temperatures.

The humidifier may be liquid-gas or gas—gas contact tower having media for enhancing gas-liquid or gas—gas contact, for example, a packed column or plate column with or without recirculation. It will be appreciated that other methods and means for humidifying the supply of fuel, fuel and air, or air may be suitably employed. Water is introduced at the top, the gases to be humidified at the bottom, gases leave the top humidified at the operating temperature of the humidifier, and excess water leaves the bottom. The flow rate of the supply of dry fuel and air and the flow rate of the supply of water into the humidifier may be suitably regulated using valves (not shown) which are regulated or adjusted either manually or automatically.

The temperature of the supply of fuel and air is typically heated to a temperature of between about 75 degrees Celsius and about 90 degrees Celsius, and desirably to a temperature of about 84 degrees Celsius. The temperature of the heated fuel and air may also be to a temperature operable to vaporize the supply of water. It will be appreciated that the temperature of the heated fuel and air may be at a higher or a lower temperature depending to the fuel cell system.

Thus, while various embodiments of the present invention have been illustrated and described, it will be appreciated to those skilled in the art that many changes and modifications may be made thereunto without departing from the spirit and scope of the invention. For example, the various features and elements of the fuel cell systems may be combined in various combinations.

What is claimed is:

1. A method for humidifying a supply of fuel and air for use in a fuel processor, the method comprising:
    receiving a supply of a mixture of dry fuel and air at a first temperature;
    heating the supply of the mixture of dry fuel and air to a second temperature greater than the first temperature; and
    combining the supply of the mixture of dry fuel and air at the second temperature with a supply of water.

2. The method of claim 1 wherein the heating comprises transferring heat from a fuel cell system to heat the supply of fuel and air.

3. The method of claim 1 wherein the heating comprises transferring heat from a fuel processor to heat the supply of fuel and air.

4. The method of claim 1 wherein the heating comprises transferring heat to the supply of fuel and air from a heat exchanger disposed between a high temperature shift device and a low temperature shift device of a fuel processor.

5. The method of claim 1 wherein the heating comprises transferring heat to the supply of fuel and air from a heat exchanger disposed between a low temperature shift device and a preferential oxidation device of a fuel processor.

6. The method of claim 1 wherein the heating comprises transferring heat to the supply of fuel and air from a heat exchanger operably connected to a supply of reformate from a fuel processor.

7. The method of claim 1 wherein the heating comprises transferring heat to the supply of fuel and air from an anode tail-gas oxidizer to heat the supply of fuel and air.

8. The method of claim 1 wherein the heating comprises heating the supply of fuel and air to the second temperature comprising a temperature of between about 75 degrees Celsius and about 90 degrees Celsius.

9. The method of claim 1 wherein the heating comprises heating the supply of fuel and air to the second temperature comprising a temperature of about 84 degrees Celsius.

10. The method of claim 1 wherein the heating comprises heating the supply of fuel and air to the second temperature operable to vaporize the supply of water.

11. The method of claim 1 further comprising heating the combined supply of fuel, air, and water.

12. The method of claim 1 further comprising transferring heat from a fuel processor to heat the combined supply of fuel, air, and water.

13. The method of claim 1 further comprising transferring heat from a heat exchanger operable connected to an autothermal reactor of a fuel processor to heat the combined supply of fuel, air, and water.

14. The method of claim 1 further comprising reducing the pressure of the supply of fuel and air.

15. The method of claim 1 further comprising reducing the pressure of the supply of fuel and air prior to combining the supply of fuel and air at the second temperature with the supply of water.

16. The method of claim 1 wherein the heating comprises heating a supply of hydrocarbon fuel and air.

17. The method of claim 1 wherein the heating comprises heating a supply of at least one of methane, propane, methanol, ethanol, and natural gas.

18. A method for generating electricity, the method comprising:
   receiving a supply of a mixture of dry fuel and air at a first temperature;
   heating the supply of the mixture of dry fuel and air to a second temperature greater than the first temperature;
   combining the supply of the mixture of dry fuel and air at the second temperature with a supply of water;
   reforming the combined supply of fuel, air, and water; and
   reacting the reformed supply of fuel, air, and water with an oxidant to generate electricity.

19. The method of claim 18 wherein the reforming comprises steam reforming.

20. The method of claim 18 wherein the heating comprises transferring heat from a fuel cell system to heat the supply of fuel and air.

21. The method of claim 18 wherein the heating comprises transferring heat from a fuel processor to heat the supply of fuel and air.

22. The method of claim 18 wherein the heating comprises transferring heat to the supply of fuel and air from a heat exchanger disposed between a high temperature shift device and a low temperature shift device of a fuel processor.

23. The method of claim 18 wherein the heating comprises transferring heat to the supply of fuel and air from a heat exchanger disposed between a low temperature shift device and a preferential oxidation device of a fuel processor.

24. The method of claim 18 wherein the heating comprises transferring heat to the supply of fuel and air from a heat exchanger operably connected to a supply of reformate from a fuel processor.

25. The method of claim 18 wherein the heating comprises transferring heat to the supply of fuel and air from an anode tail-gas oxidizer.

26. The method of claim 18 wherein the heating comprises heating the supply of fuel and air to the second temperature comprising a temperature of between about 75 degrees Celsius and about 90 degrees Celsius.

27. The method of claim 18 wherein the heating comprises heating the supply of fuel and air to the second temperature comprising a temperature of about 84 degrees Celsius.

28. The method of claim 18 wherein the heating comprises heating the supply of fuel and air to the second temperature operable to vaporize the supply of water.

29. The method of claim 18 further comprising heating the combined supply of fuel, air, and water.

30. The method of claim 18 further comprising transferring heat from a fuel processor to heat the combined supply of fuel, air, and water.

31. The method of claim 18 further comprising transferring heat from a heat exchanger operable connected to an autothermal reactor of a fuel processor to heat the combined supply of fuel, air, and water.

32. The method of claim 18 further comprising reducing the pressure of the supply of fuel and air.

33. The method of claim 18 further comprising reducing the pressure of the supply of fuel and air prior to combining the supply of fuel and air at the second temperature with the supply of water.

34. The method of claim 18 wherein the heating comprises heating a supply of hydrocarbon fuel and air.

35. The method of claim 18 wherein the heating comprises heating a supply of at least one of methane, propane, methanol, ethanol, and natural gas.

36. A fuel processor for reforming a supply of fuel and air for a fuel cell, said fuel processor comprising;
   a first heat exchanger for heating a supply of a mixture of dry fuel and air at a first temperature to a second temperature greater than the first temperature prior to humidification of the supply of the mixture of dry fuel and air;
   an autothermal reactor for receiving the supply the mixture of dry of fuel and air after humidification;
   at least one of a high temperature shift device and a low temperature shift device operably connected to said autothermal reactor; and
   a preferential oxidation device, operably connected to said at least one of said high temperature shift device and said low temperature shift device, for discharging a supply of reformate.

37. The fuel processor of claim 36 wherein said first heat exchanger is disposed between said high temperature shift device and said low temperature shift device.

38. The fuel processor of claim 36 wherein said first heat exchanger is disposed between said low temperature shift device and said preferential oxidation device.

39. The fuel processor of claim 36 wherein said first heat exchanger is operably connected to receive reformate from said preferential oxidation device.

40. The fuel processor of claim 36 further comprising a second heat exchanger for heating the supply of humidified fuel and air after humidification and prior to receipt in said autothermal reactor.

41. The fuel processor of claim 40 wherein said second heat exchanger is disposed between said autothermal reactor and said at least one of said high temperature shift device and said low temperature shift device.

42. A fuel cell system comprising:
   means for heating a supply of a mixture of dry fuel and air at a first temperature to a second temperature greater than the first temperature;
   means for humidifying the supply of the mixture of dry fuel and air at the second temperature;
   means for reforming the supply of humidified fuel and air; and
   means for reacting the reformed supply of humidified fuel and air with an oxidant to generate electricity.

43. The fuel cell system of claim 42 further comprising means for heating the supply of humidified fuel and air.

44. The fuel cell system of claim 42 further comprising means for reducing the pressure in said means for humidifying the supply of fuel and air at the second temperature.

45. The fuel cell system of claim 42 wherein said means for reacting the reformed supply of humidified fuel and air with an oxidant to generate electricity comprises a PEM fuel cell.

46. The fuel cell system of claim 45 wherein said PEM fuel cell comprises a fuel cell stack.

47. A fuel cell system comprising:
- a first heat exchanger for heating a supply of a mixture of dry fuel and air to a second temperature greater than the first temperature;
- a humidifier for humidifying the supply of the mixture of dry fuel and air at the second temperature;
- a fuel processor for reforming the supply of humidified fuel and air; and
- a fuel cell for reacting the reformed supply of humidified fuel and air with an oxidant to generate electricity.

48. The fuel cell systems of claim 47 wherein said first heat exchanger is disposed in said fuel processor.

49. The fuel cell system of claim 47 wherein said first heat exchanger is disposed between a high temperature shift device and a low temperature shift device of said fuel processor.

50. The fuel cell system of claim 47 wherein said first heat exchanger is disposed between a low temperature shift device and a preferential oxidation device of said fuel processor.

51. The fuel cell system of claim 47 wherein said first heat exchanger is operably connected to receive reformate from a preferential oxidation device of said fuel processor.

52. The fuel cell system of claim 47 further comprising a second heat exchanger for heating the supply of humidified fuel and air.

53. The fuel cell system of claim 47 wherein said fuel processor comprises a second heat exchanger for heating the supply of humidified fuel and air.

54. The fuel cell system of claim 53 wherein said second heat exchanger is operably connected to an autothermal reactor of said fuel processor.

55. The fuel cell system of claim 47 further comprising at least one of a blower and a vacuum for reducing the pressure in said humidifier.

56. The fuel cell system of claim 47 wherein said fuel cell comprises a PEM fuel cell.

57. The fuel cell system of claim 56 wherein said PEM fuel cell comprises a fuel cell stack.

* * * * *

UNITED STATES PATENT AND TRADEMARK OFFICE
CERTIFICATE OF CORRECTION

PATENT NO. : 6,670,062 B2
DATED : December 30, 2003
INVENTOR(S) : Rush, Jr.

It is certified that error appears in the above-identified patent and that said Letters Patent is hereby corrected as shown below:

<u>Title page,</u>
Item [57], ABSTRACT,
Line 9, delete the word "dry" in the first instance <u>Column 8,</u>
Lines 26 and 27, delete "an autothermal reactor for receiving the supply the mixture of dry of fuel and air after humidification;" and insert -- an autothermal reactor for receiving the supply of the mixture of dry fuel and air after humdification --

Signed and Sealed this

Twenty-fifth Day of May, 2004

JON W. DUDAS
*Acting Director of the United States Patent and Trademark Office*